United States Patent [19]

Keen et al.

[11] 3,738,324

[45] June 12, 1973

[54] GRILL AND GUARD ARRANGEMENT FOR POULTRY FEED TROUGHS

[75] Inventors: Everett M. Keen; Anthony J. Siciliano, both of Vineland, N.J.

[73] Assignee: Diamond International Corporation, New York, N.Y.

[22] Filed: Aug. 31, 1971

[21] Appl. No.: 176,614

[52] U.S. Cl. .................................. 119/18, 119/61
[51] Int. Cl. ............................................ A01k 05/00
[58] Field of Search .......................... 119/61, 63, 18

[56] References Cited
UNITED STATES PATENTS

| | | | |
|---|---|---|---|
| 1,840,264 | 1/1932 | Speicher | 119/61 |
| 945,242 | 1/1910 | Merrill | 119/63 |
| 1,672,043 | 6/1928 | Seikman | 119/61 |
| 2,221,013 | 11/1940 | White | 119/61 |

Primary Examiner—Hugh R. Chamblee
Attorney—Karl W. Flocks

[57] ABSTRACT

A grill and guard arrangement adapted to be secured over a poultry feed trough including adjustably secured grid sections one of which may be selectively positioned to effect small feed openings over the trough to accommodate relatively young chickens and prevent their falling into the trough or to effect somewhat larger feed openings over the trough to accommodate older chickens.

7 Claims, 9 Drawing Figures

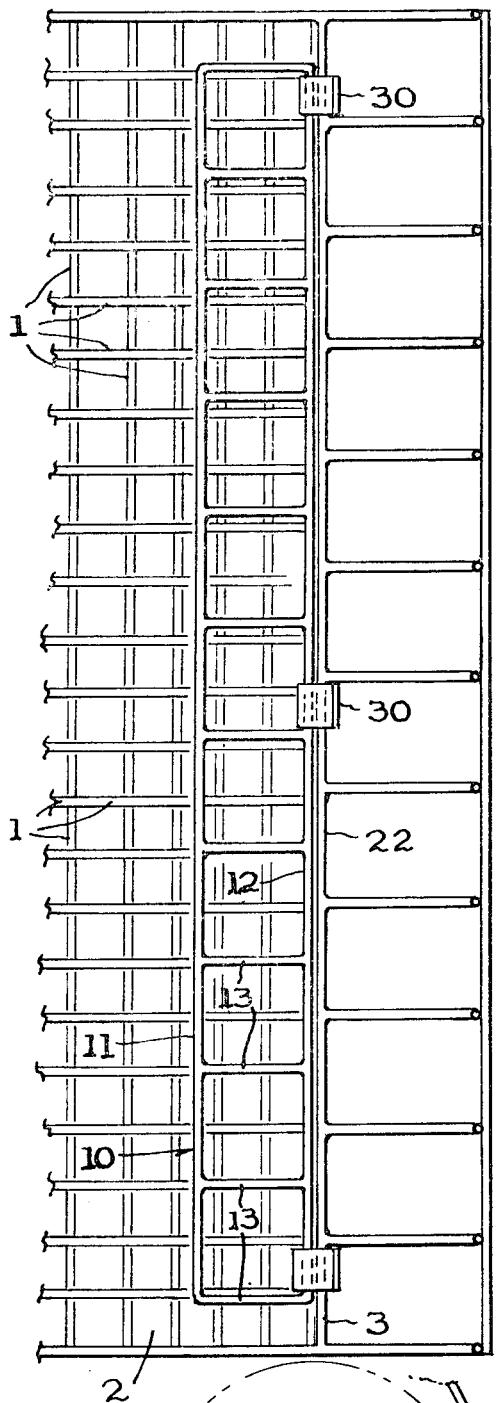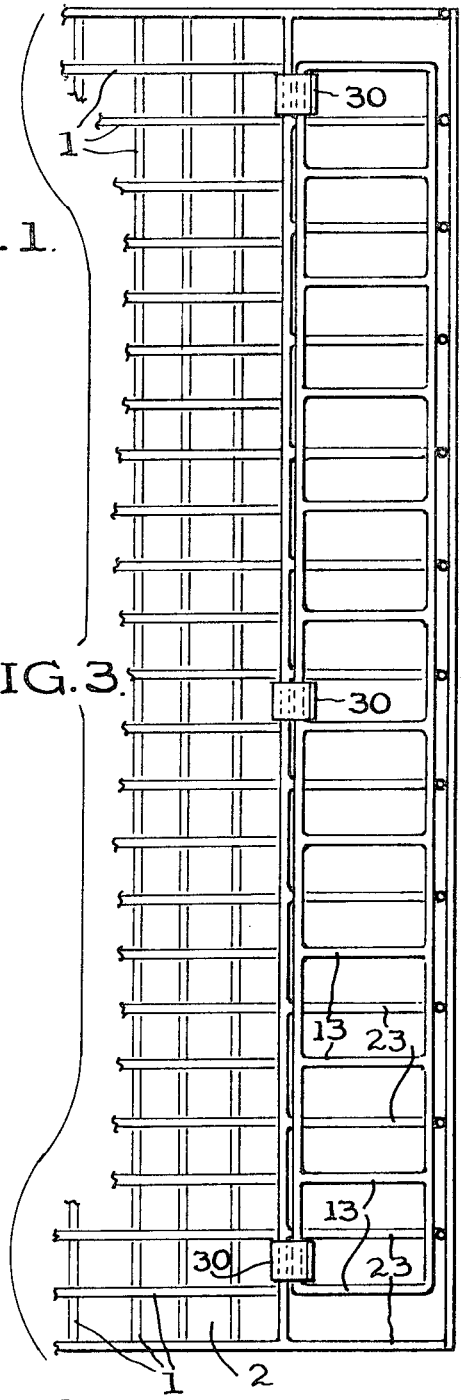

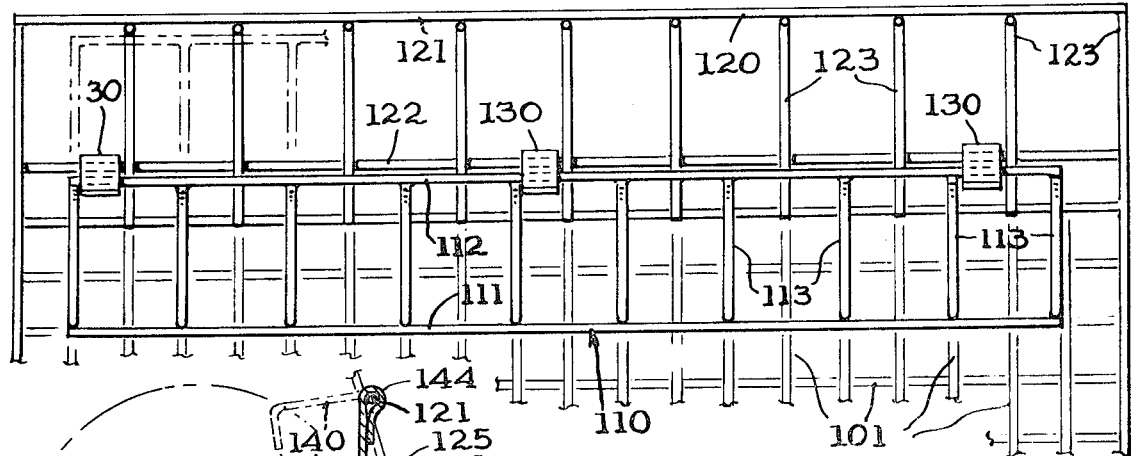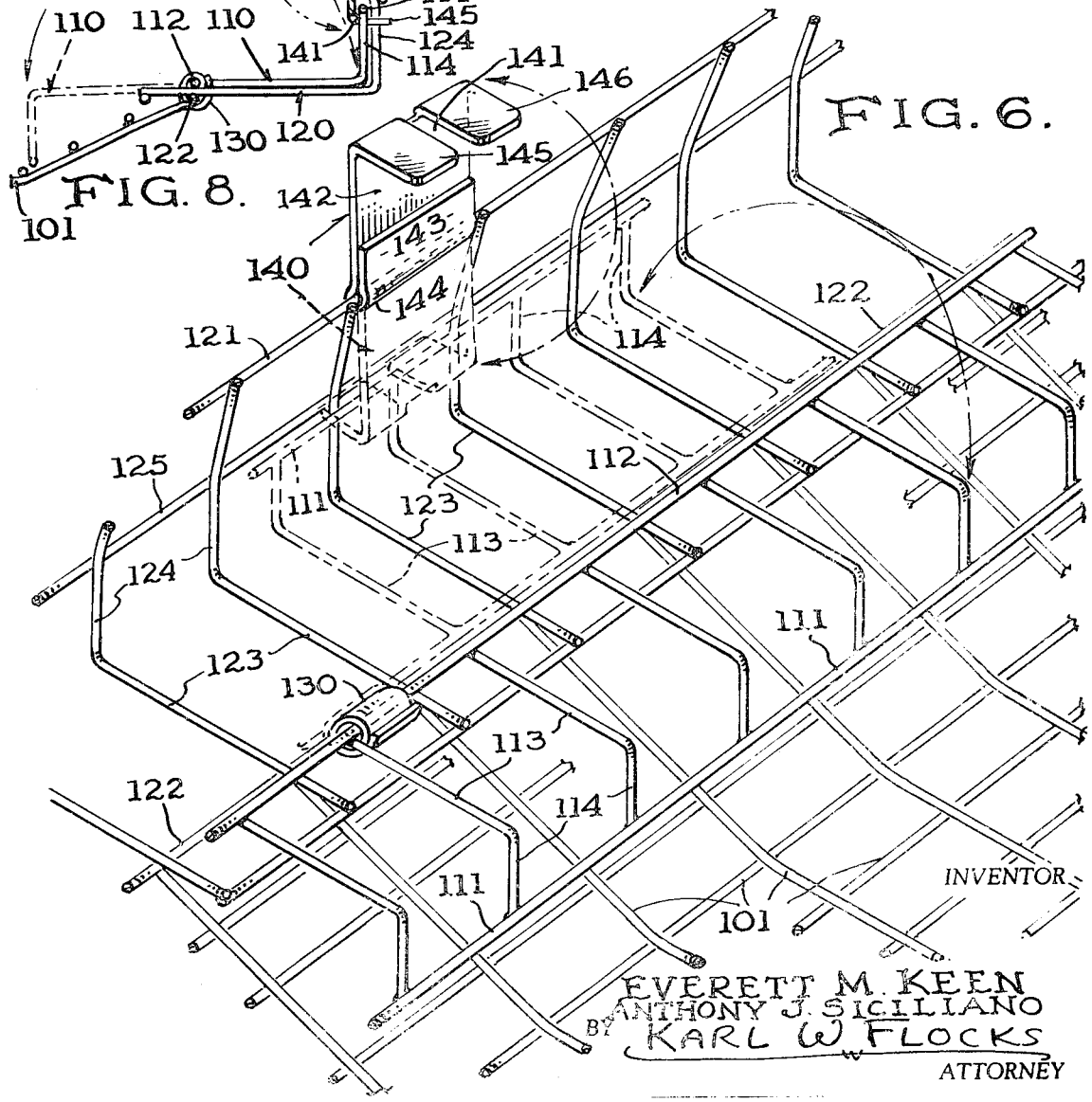

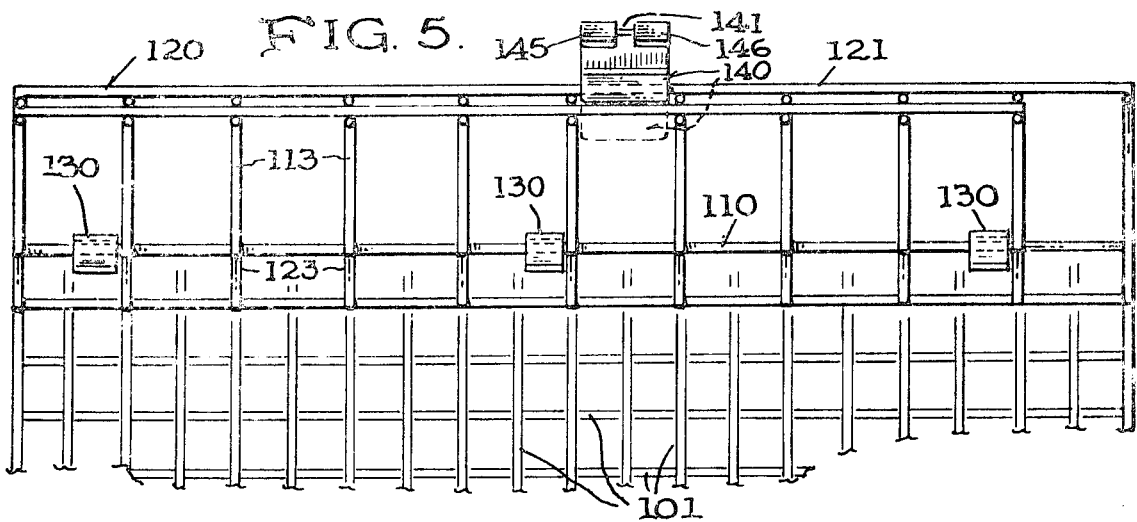
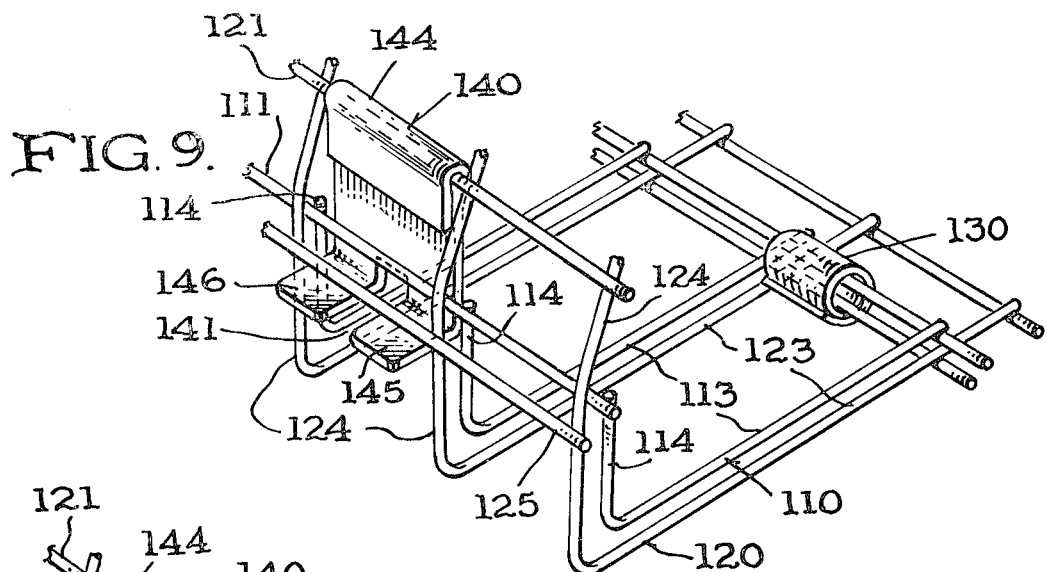
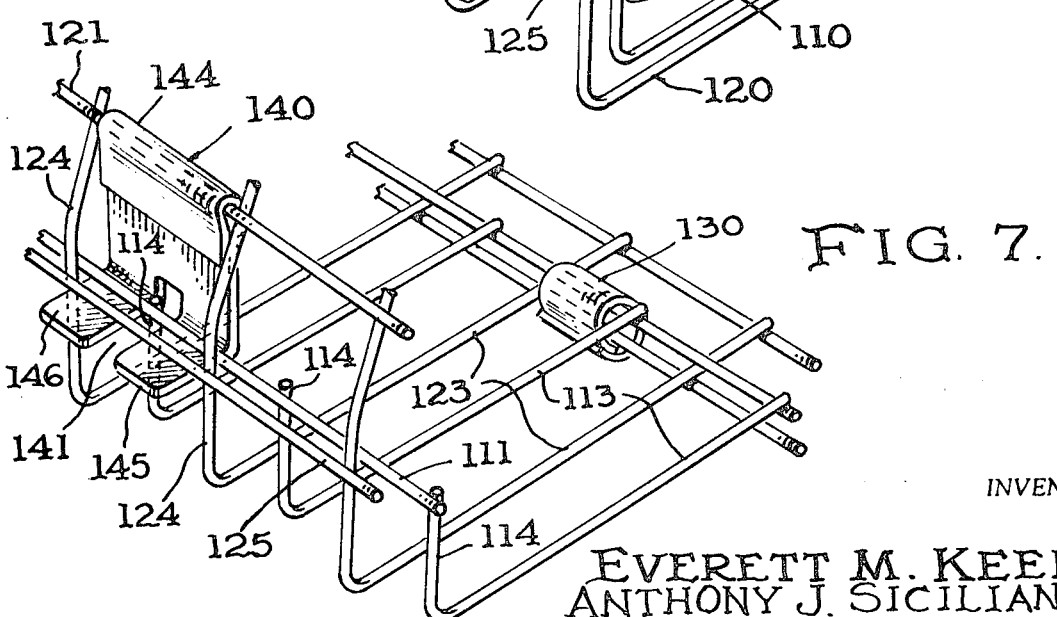

3,738,324

GRILL AND GUARD ARRANGEMENT FOR POULTRY FEED TROUGHS

DISCUSSION OF THE PRIOR ART

In the field of animal husbandry, particularly with respect to the feeding of confined animals, it is known that separating means are necessary to prevent crowding in the feeding area. Typical separating means of this type in the prior art generally comprise dividing rods, bars and gridlike grills. Basically the prevention of crowding is necessary so that each animal may feed itself regardless of the aggressiveness of others confined to the same area. Additionally, such separating devices prevent animals from contaminating the feed area and wasting it as by dropping or scattering it out of the area. Typical animal separating devices for purposes of feeding are illustrated and referred to, by way of example only in the U.S. Pats. to Mendenhall No. 661,937; Felker No. 1,022,688; White No. 1,805,859 and Dost No. 2,122,880.

BACKGROUND OF THE INVENTION

Animal feed separating devices as illustrated in the prior art discussed above, although they have served the purpose for which they were designed, do not have the inherent versatility required in modern commercial chicken husbandry. In this connection from economy and space considerations chickens are maintained in the same cages from the time that they are hatched until they are matured. With the foregoing in mind it is clear that cage construction must be able to accommodate small or large chickens as may be required by the prevailing circumstances.

OBJECTS OF THE INVENTION

It is thus a general object of the present invention to provide a grill arrangement for use over or on one side of a feed trough for chicken or the like poultry.

Another object of this invention is to provide a grill and guard arrangement having the versatility of being selectively adjustable to accommodate very young chickens or chickens of a mature size.

A further object of this invention is to provide a grill and guard arrangement whereby feed openings of either of two different sizes may be selected for feeding chickens and keeping them from getting into the feed trough, especially young chicks which otherwise might be killed by the automatic feed conveyor.

Yet another object of the present invention is to provide a grill and guard arrangement whereby the guard element may be placed in a position whereby it may serve as a ramp or perch.

These and other objects of the invention, as well as the advantages thereof over existing prior art forms, will become apparent from the following detailed description of the attached drawings and are accomplished by means hereinafter described and claimed.

The invention may be briefly described in general terms as comprising a grill member in grid form with a guard member also in grid form adjustably attached thereto by a plurality of loops around a longitudinally extending side of each of said grill and guard members. The grid forming the guard member is adjustable to a position where it may bisect the opening of the grill member so as to double the number of feed openings, but reduce the size thereof to half. The guard member may also be adjusted to a position whereby the size and number of feed openings in the grill member are unaffected thereby.

DESCRIPTION OF THE DRAWINGS

FIG. 1 is a plan view of one embodiment of this invention wherein the grill and guard arrangement provides feed openings to accommodate relatively large chickens;

FIG. 2 is a plan view of the grill and guard arrangement shown in FIG. 1 with the guard arrangement adjusted to provide feed openings to accommodate relatively young chickens;

FIG. 3 is an end elevational view of the grill and guard arrangement shown in FIG. 1;

FIG. 4 is a plan view similar to FIG. 1 of a second embodiment of this invention;

FIG. 5 is a plan view of the grill and guard arrangement shown in FIG. 4 but with the guard member superposed over the grill member to provide feed openings for relatively large chickens;

FIG. 6 is a perspective view of the grill and guard arrangement as shown in FIG. 4;

FIG. 7 is a perspective view of the grill and guard arrangement of FIG. 4 with the guard member in a position besecting the feed openings of the grill member to accommodate relatively small chickens;

FIG. 8 is a sectional view in elevation of the grill and guard arrangement as shown in FIG. 7; and FIG. 9 is a perspective view of the grill and guard arrangement as shown in FIG. 5 with the latch mechanism in locking position.

DESCRIPTION OF THE PREFERRED EMBODIMENTS

Reference is now made to the embodiment illustrated in FIGS. 1–3 of the drawings, in which similar numerals refer to similar parts throughout. Reference 1 designates the screen floor of a cage in which chickens are housed from the time that they are hatched until they are ready for marketing. At the front end of the floor 1 there is an upwardly inclined ramp 2 which terminates at the bottom of a wall portion 3. Outwardly of the wall portion 3 is a feed trough 31 which extends for the length of the cage. Extending horizontally over the top of the feed trough 31 and outwardly from the top of the vertical wall portion 3 is the grill element 20 in accordance with this invention. The grill element 20 extends to the bottom of an outer wall 4. The grill element 20 may optionally be made integral with the cage wall portions 3 and 4 or it may be detachably secured thereto. The grill element 20 is in the form of a grid with at least a pair of horizontally spaced, longitudinally extending wire or rod elements 21 and 22. Transversely extending between and connecting the longitudinally extending wire members 21 and 22 are a plurality of equally spaced cross members 23 forming a plurality of equal sized feed openings which are adapted to accommodate relatively large sized chickens. Adjustably connected to the grill member 20 is a guard member 10, which comprises a pair of longitudinally extending parallel wire or rod elements 11 and 12 extending substantially colinearly or side-by-side. Extending transversely of and connecting the wire elements 11 and 12 are a plurality of equally spaced cross bars 13 the spacing of which is substantially equal to that of the cross bars 23 of the grid member 20. As assembled the longitudinally extending wire element 12 of the guard member 10 extends substantially colinear to or in contact with the longitudinally extending wire 22 of the grill member 20. A plurality of longitudinally spaced loop members 30 pass through feed openings in both the guard member 10 and grill member 20 and around the longitudinally extending wires 12 and 22 to adjustably secure the guard member 10 to the grill member 20.

To accommodate relatively young chickens which may be housed in the cage the guard member 10 may be hinged or swung to the position shown in FIG. 2 whereby the feed openings of the grill member 20 are each bisected by a cross member 13 of the guard member 10 thus providing smaller feed openings which prevent the relatively young chickens from falling into the feed trough 31.

As the chickens mature in size the feed opening arrangement as shown in FIG. 3 may become inadequate to accommodate the larger chickens. The guard member 10 may then be swung to the position shown in FIGS. 1 and 2 whereby the feed opening between the members 23 of the grill 20 are unaffected by the guard member 10. The guard member 10 may then come to rest with the longitudinally extending wire 11 supported on the ramp 2. The guard member 10 in this position may also serve as a perch for the relatively large chickens.

Referring now to the embodiment of the invention shown in FIGS. 4–9 reference number 101 designates the screen floor to which the grill 120 is secured. The grill 120 differs from the grill 20 of the previously described embodiment in that the plurality of cross elements are generally in the shape of the letter L with horizontally and transversely extending leg portions 123 and generally vertically extending leg portions 124. The generally vertical leg portions 124 are connected at their upper ends by a longitudinally extending wire or rod member 121. The leg members 124 are also connected by a second longitudinally extending rod element 125 parallel to and below member 121. The horizontal and transversely extending leg portions 123 which form the feed openings of the grill 120 are connected by a longitudinally extending wire or rod element 122. The guard member 110 in accordance with this embodiment comprises a plurality of transversely extending L-shaped wires with horizontal legs 113 and vertical legs 114. The vertical legs 114 are connected by a longitudinally extending wire element 111, which is at substantially the same height as the wire element 125 connecting the vertical legs of the grill member 120 as shown in FIG. 7, for example. The horizontal legs 113 of the guard member 110 are connected by a longitudinally extending wire element 112, which is substantially colinear with or side-by-side with the longitudinally extending wire element 122 of the grill 120. The grill 120 and the guard 110 are adjustably secured to each other by a plurality of loop members 130 which pass through the feed openings formed by the grill 120 and the guard 110 and around the longitudinally extending wire 122 and 112 of the grill and the guard, respectively.

As clearly seen in FIG. 5 the guard member 110 is positioned over the grill to effect relatively large feed openings to accommodate large chickens. It is noted here that the loops 130 pass between the openings formed by both the grill member 120 and the guard member 110 so that the guard 110 is free to slide unrestricted by the loops 130 longitudinally and to the right with respect to the grill member 120 so that the elements 113 may bisect the openings formed by the elements 123 in the grill member 120. Thus with the bisected feed openings formed as described above relatively smaller chickens may be accommodated and prevented from falling into the feed trough in a manner similar to that provided by the embodiment described in FIGS. 1–3. To prevent the chickens from sliding the guard element 110 to the left or to the right to alter the size of the feed openings latch means 140 is provided. The latch means 140 as best shown in FIG. 6 comprises a pair of folded and abutting portions 142 and 143 with a hinged loop portion 144 around longitudinally extending wire 121 of the grill member 120. The width of the latch 140 is substantially that of the feed openings of the grill and it is held between a pair of leg members 124 to prevent movement longitudinally of the wire 121. Portion 142 is generally L-shaped and includes a notch 141 formed between angled portions 145 and 146. Operation of the latch 140 is achieved by pivoting it about wire 121.

In operation when the guard member 110 is adjusted to bisect the feed openings of grill members 120 one of the vertical legs 114 of the guard 110 is centered between a pair of vertical legs 124 of the grill 120 and the latch 140 is swung down into the opening between a pair of adjacent vertical legs 124 with the angled portions 145 and 146 of the latch 140 passing under the longitudinally extending wire 125 and 111 of the grill and guard, respectively, and with the notch 141 allowing the angled portions 145 and 146 to pass the vertically extending leg 114 to thereby lock the guard and grill members in position to accommodate small chickens.

To unlock and adjust the grill and guard arrangement to accommodate large chickens, it is only necessary to back the latch 140 from the position shown in FIG. 7, slide the guard member 110 to the left as shown in FIG. 5, and to swing the latch 140 into the space between the vertically extending legs 114 and 124 and under the longitudinally extending wire 111 and 125 as shown in FIG. 9.

It is clear that the combined width of the angled portions 145 and 146 of the latch 140 is such that when it is in the space between a pair of adjacent vertical legs 124 of the grill 120 and also in the space between a pair of adjacent vertical legs 114 of the guard 110 or with a leg 114 straddled in the notch 141 of latch 140, relative longitudinal movement between the grill 120 and the guard 110 is precluded.

In practice the grill guard according to this invention may conveniently be made in 2 or 3 feet sections with 2 inch spacings or openings and be placed over stationary 2 inch spacings to close off openings for the first several weeks that newly hatched chicks are placed in a cage. After this period of time has passed, the adjustable guard member would be adjusted to the position to effect full size openings of the grill member and would be firmly held in this position.

The grill guard arrangement according to this invention may also be placed in a feed trough above a feeder chain or other feed conveying means.

While preferred forms and arrangement of parts have been shown in illustrating the invention, it is to be clearly understood that various changes in details and arrangement of parts may be made without departing

What is claimed is:

1. A hinged wire grill and guard arrangement comprising a first grid section having a plurality of openings of uniform size and a second grid section having a plurality of openings of uniform size, said second grid section being adjustably secured to said first grid section to provide two different sets of openings, said first grid section being adapted to be secured over a feed trough for chickens, characterized in that said second grid section is selectively adjustable to a first position overlying and bisecting the openings of said first grid section whereby a set of small openings is provided through which relatively young chickens may feed themselves or to a second position in which the openings of said first grid section are not affected by said second grid section whereby a set of larger openings is provided through which relatively large chickens may feed themselves, with said first and second grid sections each having at least one longitudinal side extending substantially colinearly with each other and being loosely held together by hinge means, said longitudinal sides of said first and second grid sections are in the form of wires extending side-by-side in all relative positions of said first and second grid sections, said hinge means are in the form of at least two spaced-apart loops surrounding said side-by-side wires, and said spaced-apart loops are situated between adjacent transverse wires of said first and second grid sections to allow sufficient relative longitudinal movement between said grid sections so that a direct superposed relationship or a bisecting relationship between said grid sections may be selectively assumed by sliding said second grid section relative to said first grid section.

2. A grill and guard arrangement in accordance with claim 1 wherein latch means are provided to retain said grid sections in either the selected superposed or the bisecting relationship.

3. A grill and guard arrangement in accordance with claim 2 wherein the transverse wires of each of said first and second grid sections are equally spaced apart, are L-shaped, and are fixedly secured together by at least two longitudinally extending wire members one of which is secured at the top of the vertical leg of the L and the other of which is secured adjacent the end of the horizontal leg of the L.

4. A grill and guard arrangement in accordance with claim 3 wherein the L of the transverse wires of said first grid section have longer vertical legs than that of the L of said second grid section, so that the longitudinally extending wire member of said first grid section extends above that of said second grid section.

5. A grill and guard arrangement in accordance with claim 4 wherein said latch means are hingedly connected to the longitudinally extending wire secured at the top of the vertical leg of the L-shaped wire of said first grid section, said latch means being adapted to be swung to or from a locking position and including an angled portion which may be positioned between registered openings of adjacent L-shaped wires and is of such width that it precludes relative longitudinal movement between said first and second grid sections while in said position to lock said grid sections in superposed relationship to accommodate relatively large chickens.

6. A grill and guard arrangement in accordance with claim 5 wherein said angled portion of said latch means has a notch formed therein; which is adapted to straddle the vertical portion of an L-shaped wire of said second grid section when said second grid section is in the bisecting position, to lock said grid sections from relative longitudinal movement and thereby provide a set of small openings to accommodate relatively small chickens.

7. A hinged wire grill and guard arrangement comprising a first grid section having a plurality of openings of uniform size and a second grid section having a plurality of openings of uniform size secured to said first grid section to provide two different sets of openings, said first grid section being adapted to be secured over a feed trough for chickens, characterized in that said second grid section is selectively adjustable to a first position overlying and bisecting the openings of said first grid section whereby a set of small openings is provided through which relatively young chickens may feed themselves or to a second position in which the openings of said first grid are not affected by said second grid section whereby a set of larger openings is provided through which relatively large chickens may feed themselves, with said first and second grid sections each having at least one longitudinal side extending substantially colinearly with each other and being loosely held together by hinge means, said longitudinal sides of said first and second grid sections are in the form of wires extending side-by-side in all relative positions of said first and second grid sections, said hinge means are in the form of at least two spaced-apart loops surrounding said side-by-side wires, said second grid section is swingable to a position away from said first grid section to accommodate relatively large chickens, and said spaced apart loops are each situated between adjacent transverse wires of said first and second grid sections and allow no substantial relative longitudinal movement between said grid sections.

* * * * *